United States Patent Office 3,280,172
Patented Oct. 18, 1966

3,280,172
PROCESS FOR PRODUCING ARYL ACRYLATES AND PROPIONATES
Richard Allen Baxter, Ruabon, and Joseph Teague, Glyndyfrdwy, near Corwen, Wales, assignors to Monsanto Chemicals Limited, London, England, a British company
No Drawing. Filed July 11, 1963, Ser. No. 294,258
Claims priority, application Great Britain, July 17, 1962, 27,402/62
5 Claims. (Cl. 260—473)

This invention relates to the production of aryl esters of acrylic acids, and it is also concerned with the production of aryl β-aryloxypropionates.

Aryl acrylates are useful raw materials for use, for instance, as monomers in the production of polymers and copolymers, especially those having rubbery properties, and economic methods for their manufacture are of considerable industrial importance.

Aryl β-aryloxypropionates are also of value, for example, as intermediates in the production of herbicidal compounds such as propionamides and propionanilides.

A new process for the production of aryl acrylates and aryl β-aryloxypropionates has now been discovered.

The process of the invention is one in which a maleic anhydride is heated with an excess of a phenol such that there is formed an aryl ester of an acrylic acid and an aryl β-aryloxypropionate. The two products can be separated without difficulty.

Certain of the aryl esters of acrylic acids and aryl β-aryloxypropionates are new chemical compounds.

Preferably the reactants are heated in the presence of a substance capable of functioning as a proton-acceptor, but which is otherwise substantially inert with respect to the reactants and products. Pyridine and similar organic bases are effective for this purpose.

The process is, in general, carried out at a temperature of at least 50° C., usually one in the range of about 150° C. to about 300° C., for example, at a temperature of about 200° C.

The term "a phenol" includes, in general, any substance having a hydroxyl group linked to a carbon atom of an aromatic nucleus, for example, napthols, hydroxypyridines and dihydroxybenzenes, as well as phenol itself and its homologues, and any of these compounds having a substituent other than a hydroxyl group, for instance a halogen atom, an alkoxy group or a nitro group, in the aromatic nucleus. The aryl group (which includes a substituted aryl group) of the product is, of course, derived from the phenol.

In preferred practice, the phenol is usually phenol itself or a homologue, for example a cresol or xylenol, or one of these compounds having a further substituent (as exemplified above) in the phenol nucleus.

The maleic anhydride used in the process of the invention is, in general, maleic anhydride itself or one of its homologues, for example citraconic or α,β-dimethylmaleic anhydride; or in certain instances, a maleic anhydride in which the α- or β-carbon atom carries some other substituent, for example, a halogen atom, such as chlorine.

The phenols preferably employed in preparing the acrylates and propionates of this invention are those of the formula,

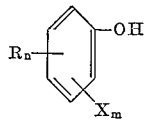

wherein R is selected from the group consisting of lower alkyl and lower alkoxy, X is selected from the class consisting of chlorine, bromine and NO₂, n is an integer from 0 to 2, and m is an integer from 0 to 3.

The esters prepared from certain of the substituted phenols mentioned above constitute a novel class of useful organic compounds. Such compounds have a formula selected from the group consisting of

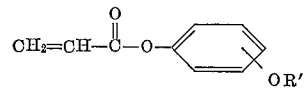

and

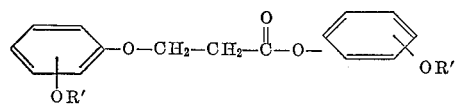

wherein R' is lower alkyl.

The new compounds are alkoxyphenyl acrylates and alkoxyphenyl β-(alkoxyphenoxy)propionates. These can be produced by the process of the invention from o-, m- and p-alkoxyphenols and maleic anhydrides. The group includes, for instance, p-methoxyphenyl acrylate and p-methoxyphenyl β-(p-methoxyphenoxy)propionate (from p-methoxyphenol and maleic anhydride); m-ethoxyphenyl arcylate and m-ethoxyphenyl β-(m-ethoxyphenoxy)propionate (from m-ethoxyphenol and maleic anhydride); and o-isobutoxyphenyl acrylate and o-isobutoxyphenyl β-(o-isobutoxyphenoxy)propionate (from o-isobutoxyphenol and maleic anhydride).

Where the reactants in the process are heated in the presence of a substance capable of functioning as a proton-acceptor, this substance is one which is substantially inert towards the reactants and products. Tertiary amines usually fulfill these conditions, and pyridine and its homologues, for instance the picolines, and quinoline are particularly suitable. Tertiary anilines such as diethylaniline can also be used. In other instances, the substance capable of functioning as a proton-acceptor can be a compound of another type, for instance, an alkali metal salt of the phenol that is used in the process (where the proton-acceptor is the phenate ion), or an alkali metal alkoxide (where the proton-acceptor is the alkoxide ion).

In the process, the phenol is employed in excess; that is to say, at least one mol of the phenol is used for each mol of maleic anhydride. Preferably there are employed at least about 3 mols, for example between about 5 and about 10 mols, of the phenol per mol of maleic anhydride.

When used, the substance capable of functioning as a proton-acceptor need generally be present in only catalytic amount, for example from about 0.01 to about 0.1 mol per mol of the maleic anhydride. Larger quantities can be used, however, for example, up to about 0.5 mol per mol of maleic anhydride. Good results are obtained using about 0.1 mol of the proton-acceptor per mol of the maleic anhydride.

In general, the process can be operated under any conditions where the reactants are heated together at an appropriate temperature. A liquid-phase process is often the most suitable, and in many instances this can conveniently be conducted at the boiling point of the phenol. The acrylate and β-aryloxy-propionate are readily separated, for example by fractional distillation.

The invention is illustrated by the following examples.

EXAMPLE 1

A molten mixture of 19.6 grams (0.2 mol) of maleic anhydride and 18.8 grams (0.2 mol) of phenol is added to a stirred, boiling mixture of 56.4 grams (0.6 mol) of phenol and 1.6 grams (0.02 mol) of pyridine, the addition being carried out under reflux over a period of three hours. The reaction mixture is then refluxed for a further period of 4½ hours, after which it is cooled, taken into ether, and separated into acid, neutral and basic fractions by the usual procedure.

Fractional distillation of the neutral fraction gives 9.0 grams of phenyl acrylate having a boiling range of 40–50° C. at a pressure of 0.5 mm. of mercury, and 10.5 grams of phenyl β-phenoxypropionate having a boiling range of 140–150° C. at the same pressure. The phenyl β-phenoxypropionate solidifies on cooling and is recrystallized from petroleum ether to give needles having a melting point of 40–41° C.

EXAMPLE 2

Maleic anhydride is reacted with an excess of p-methoxyphenol by a procedure essentially the same as that described in Example 1.

From the reaction product, the new compounds p-methoxyphenyl acrylate and p-methoxyphenyl β-(p-methoxyphenoxy)-propionate are isolated. The former has a crystallizing point of 20.7° C., and the composition: C, 67.3; H, 6.1%. ($C_{10}H_{10}O_3$ requires C, 67.4; H, 5.6%.) The latter has a melting point of 65.5–66.5° C., and the composition: C, 68.05; H, 6.0%. ($C_{17}H_{18}O_5$ requires C, 67.5; H, 6.0%.)

EXAMPLES 3–15

The procedure of Example 1 is again followed with the phenols noted. The acrylates and propionates obtained are separated in the manner described above and are identified as noted.

(3) Phenolic reactant: 2,4-xylenol.
Products: 2,4-dimethylphenyl acrylate; 2,4-dimethylphenyl β-(2,4-dimethylphenoxy)propionate.

(4) Phenolic reactant: 2-isopropyl-4-chlorophenol.
Products: 2-isopropyl-4-chlorophenyl acrylate; 2-isopropyl-4-chlorophenyl β-(2-isopropyl-4-chlorophenoxy)-propionate.

(5) Phenolic reactant: 2,4-dinitrophenol.
Products: 2,4-dinitrophenyl acrylate; 2,4-dinitrophenyl β-(2,4-dinitrophenoxy)propionate.

(6) Phenolic reactant: 3,4,5-trichlorophenol.
Products: 3,4,5-trichlorophenyl acrylate; 3,4,5-trichlorophenyl β-(3,4,5-trichlorophenoxy)propionate.

(7) Phenolic reactant: 2,5-di-t-butylphenol.
Products: 2,5-di-t-butylphenyl acrylate; 2,5-di-t-butylphenyl β-(2,5-di-t-butylphenoxy)propionate.

(8) Phenolic reactant: p-ethoxyphenol.
Products: p-ethoxyphenyl acrylate; p-ethoxyphenyl β-(p-ethoxyphenoxy)propionate.

(9) Phenolic reactant: 3,5-dichloroguaicol.
Products: 3,5-dichloro-2-methoxyphenyl acrylate; 3,5-dichloro - 2-methoxyphenyl β-(3,5-dichloro - 2-methoxyphenoxy)-propionate.

(10) Phenolic reactant: 3-ethyl-5-nitrophenol.
Products: 3-ethyl-5-nitrophenyl acrylate; 3-ethyl-5-nitrophenyl β-(3-ethyl-5-nitrophenoxy)propionate.

(11) Phenolic reactant: 2,6-dibromo-4-nitrophenol.
Products: 2,6-dibromo-4-nitrophenyl acrylate; 2,6-dibromo-4-nitrophenyl β-(2,6-dibromo-4-nitrophenoxy)propionate.

(12) Phenolic reactant: m-butoxyphenol.
Products: m-butoxyphenyl acrylate; m-butoxyphenyl β-(m-butoxyphenoxy)propionate.

(13) Phenolic reactant: Cresol.

Products: 2-methoxy-4-methylphenyl acrylate; 2-methoxy-4-methylphenyl β-(2-methoxy - 4-methylphenoxy)-propionate.

(14) Phenolic reactant: p-isopropoxyphenol.
Products: p-isopropoxyphenyl acrylate; p-isopropoxyphenyl β-(p-isopropoxyphenoxy)propionate.

(15) Phenolic reactant: 2,4,6-tribromo-3,5-xylenol.
Products: 3,5-dimethyl-2,4,6-tribromophenyl acrylate; 3,5-dimethyl-2,4,6-tribromophenyl β- (3,5-dimethyl-2,4,6-tribromophenoxy)propionate.

While the invention has been described herein with regard to several specific embodiments, it is not so limited. It is to be understood that modifications and variations of the invention, obvious to those skilled in the art, may be made without departing from the spirit and scope of said invention.

What is claimed is:

1. A process for preparing an aryl acrylate and an aryl β-aryloxypropionate which comprises heating, at a temperature of at least about 50° C. and in the presence of a tertiary amine, maleic anhydride with at least an equimolar amount of a phenol of the formula,

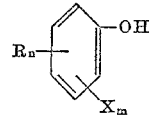

wherein R is selected from the group consisting of lower alkyl and lower alkoxy, X is selected from the group consisting of chlorine, bromine and $NO_2$, $n$ is an integer from 0 to 2, and $m$ is an integer from 0 to 3, at least 0.01 mol of tertiary amine being employed per mol of maleic anhydride.

2. A process as defined in claim 1 wherein the molar ratio of maleic anhydride to phenol is from 1:1 to about 1:10.

3. A process as defined in claim 1 wherein the heating is at a temperature of from about 50° C. to about 300° C.

4. A process as defined in claim 1 wherein the tertiary amine is selected from the group consisting of pyridine, picoline, quinoline and dialkylaniline.

5. A process as defined in claim 1 wherein from 0.01 to about 0.5 mol of tertiary amine is employed per mol of maleic anhydride.

References Cited by the Examiner

UNITED STATES PATENTS

| | | | |
|---|---|---|---|
| 2,048,465 | 7/1936 | Reiff et al. | 260—479 X |
| 2,386,446 | 10/1945 | De Groote et al. | 260—479 X |
| 2,822,378 | 2/1958 | Bader | 260—479 X |
| 2,958,705 | 11/1960 | Gordon et al. | 260—473 |

FOREIGN PATENTS

| | | |
|---|---|---|
| 222,433 | 6/1959 | Australia. |
| Ad. 17,417 | 9/1895 | Great Britain. |

LORRAINE A. WEINBERGER, *Primary Examiner.*

S. B. WILLIAMS, *Assistant Examiner.*